(12) United States Patent
Hara

(10) Patent No.: US 6,453,364 B1
(45) Date of Patent: Sep. 17, 2002

(54) INFORMATION REPRODUCING APPARATUS, INFORMATION RECORDING/REPRODUCING APPARATUS AND INFORMATION SELECTIVELY OUTPUTTING APPARATUS, AND ELECTRONIC APPARATUS SYSTEM THEREOF

(75) Inventor: Mitsuhiko Hara, Kanagawa-ken (JP)

(73) Assignee: Victor Company of Japan, Ltd., Tokyo (JP)

( * ) Notice: Subject to any disclaimer, the term of this patent is extended or adjusted under 35 U.S.C. 154(b) by 0 days.

(21) Appl. No.: 09/357,261

(22) Filed: Jul. 20, 1999

(30) Foreign Application Priority Data

Jul. 21, 1998 (JP) .......................... 10-204900
May 10, 1999 (JP) .......................... 11-128426

(51) Int. Cl.[7] .............................. G06F 3/00; G06F 13/00
(52) U.S. Cl. .............................. 710/16; 710/29; 386/97; 386/123; 386/124
(58) Field of Search .......................... 386/97, 123, 124; 710/16, 29

(56) References Cited

U.S. PATENT DOCUMENTS 5,557,424 A * 9/1996 Panizza .................... 386/97
5,838,875 A * 11/1998 Cho et al. ................. 386/123

FOREIGN PATENT DOCUMENTS

JP   10-126744/1998    5/1998

* cited by examiner

Primary Examiner—Jeffrey Gaffin
Assistant Examiner—Tammara Peyton
(74) Attorney, Agent, or Firm—Anderson Kill & Olick; Eugene Lieberstein; Michael N. Meller

(57) ABSTRACT

The control section 42 of the first VCR 2 discriminates information reproduced from a magnetic tape whether the information is analog information or digital information. In case of reproducing analog information, the recording/reproducing section 43 outputs reproduced information to the analog signal terminal 53. In case of reproducing digital information, the control section 42 controls the recording/reproducing section 43 so as to output reproduced information to the digital signal terminal 51 through the digital interface section 41.

5 Claims, 8 Drawing Sheets

| | msb | | | | | | | lsb |
|---|---|---|---|---|---|---|---|---|
| opcode | Medium information (DAh) | | | | | | | |
| operand[0] | 7Fh | | | | | | | |
| operand[1] | 7Fh | | | | | | | |

*Fig. 6(a)*

| | msb | | | | | | | lsb |
|---|---|---|---|---|---|---|---|---|
| opcode | Medium information (DAh) | | | | | | | |
| operand[0] | Type of cassette | | | | | | | |
| operand[1] | Tape grade and recording inhibited | | | | | | | |

*Fig. 6(b)*

| | msb | | | | | | | lsb |
|---|---|---|---|---|---|---|---|---|
| opcode | Output signal mode (78h) | | | | | | | |
| operand[0] | FFh | | | | | | | |

*Fig. 8(a)*

| | msb | | | | | | | lsb |
|---|---|---|---|---|---|---|---|---|
| opcode | Output signal mode (78h) | | | | | | | |
| operand[0] | signal mode | | | | | | | |

*Fig. 8(b)*

| Type of cassette | Tape grade and recording inhibited | Content of information |
|---|---|---|
| DVC standard cassette (31h) | 30h | Recording enabled |
| | 31h | Recording inhibited |
| DVC mini-cassette (32h) | 30h | Recording enabled |
| | 31h | Recording inhibited |
| VHS cassette (22h) | 30h | VHS tape recording enabled |
| | 31h | VHS tape recording inhibited |
| | 40h | S-VHS tape recording enabled |
| | 41h | S-VHS tape recording inhibited |
| | 50h | D-VHS tape recording enabled |
| | 51h | D-VHS tape recording inhibited |
| VHS-C cassette (23h) | 30h | VHS tape recording enabled |
| | 31h | VHS tape recording inhibited |
| | 40h | S-VHS tape recording enabled |
| | 41h | S-VHS tape recording inhibited |
| No cassette present (60h) | 7Fh | |
| Unknown cassette (7Eh) | 7Fh | |

*Fig. 7*

| Value | Signal mode |
|---|---|
| 00h | SD 525/60 |
| 04h | SDL 525/60 |
| 08h | HD 1125/60 |
| 80h | SD 625/50 |
| 84h | SDL 625/50 |
| 88h | HD 1250/50 |
| 10h | MPEG 25Mbps-60 |
| 14h | MPEG 12.5Mbps-60 |
| 18h | MPEG 6.25Mbps-60 |
| 90h | MPEG 25Mbps-50 |
| 94h | MPEG 12.5Mbps-50 |
| 98h | MPEG 6.25Mbps-50 |
| 01h | D-VHS Digital |
| 05h | Analog VHS NTSC 525/60 |
| 25h | Analog VHS M-PAL 525/60 |
| A5h | Analog VHS PAL 625/50 |
| B5h | Analog VHS N-PAL 625/60 |
| C5h | Analog VHS SECAM 625/50 |
| D5h | Analog VHS ME-SECAM 625/50 |
| 0Dh | Analog S-VHS 525/60 |
| EDh | Analog S-VHS 625/50 |

*Fig. 9*

INFORMATION REPRODUCING APPARATUS, INFORMATION RECORDING/ REPRODUCING APPARATUS AND INFORMATION SELECTIVELY OUTPUTTING APPARATUS, AND ELECTRONIC APPARATUS SYSTEM THEREOF

BACKGROUND OF THE INVENTION

1. Field of the Invention

The present invention relates to an information reproducing apparatus and an information recording/reproducing apparatus, which can reproduce analog information and/or digital information recorded in a recording medium, and relates to an information selectively outputting apparatus and an electronic apparatus system thereof.

2. Description of the Related Art

A digital interface bus standardized by the IEEE (The Institute of Electrical and Electronics Engineers, Inc.) 1394 is well known as a high functional digital interface bus, which assures that a rate of data transmission is more than 100 Mbps (Megabit per second) and can transfer video and audio information as well as control information. The high functional digital interface bus is hereinafter called an "1394 interface bus".

Accordingly, digital information can be mutually conveyed in between a VCR (Video Cassette Recorder), which can record and reproduce a MPEG (Moving Picture Experts Group) 2 transport stream packet (TS packet), and a digital broadcast receiving apparatus equipped with a receiver section for digital broadcasting and a MPEG decoder by connecting them with an "1394 interface bus".

On the other hand, a VCR in conformity with the D-VHS (the registered trademark of VICTOR COMPANY OF JAPAN, LTD.) system can record and reproduce the above-mentioned MPEG2 TS packet and general digital information such as digital information outputted from a personal computer. The VCR can also record and reproduce analog information in conformity with the regular VHS (the registered trademark of VICTOR COMPANY OF JAPAN, LTD.) system.

Since a system comprising a digital broadcast receiving apparatus 101, a VCR 102 and a monitor 103 is usually configured by connecting them as shown in FIG. 12, it is preferable that analog information reproduced by a VCR 102 of the D-VHS® system can be outputted to or indicated on the monitor 103 through the digital broadcast receiving apparatus 101. However, a video signal in analog can not be transmitted through an "1394 interface bus" as it is. Therefore, reproduced analog information shall be transmitted to the digital broadcast receiving apparatus 101 through an analog signal line independent of the "1394 interface bus".

Accordingly, while the VCR 102 reproduces a magnetic tape recorded with an analog information and a digital information mixed in, it is advisable that information outputted to the monitor 103 shall not be interrupted by switching an interface utilized immediately in response to reproduced information whenever the reproduced information changes from digital information to analog information and vice versa. In other words, the "1394 interface bus" shall be switched over to the analog signal line and vice versa in response to reproduced information whenever the reproduced information changes from digital information to analog information and vice versa.

SUMMARY OF THE INVENTION

Accordingly, an object of the present invention is to provide an information reproducing apparatus and an information recording/reproducing apparatus and an electronic apparatus system thereof, which can reproduce analog information and/or digital information recorded in an recording medium and can immediately switch one interface such as the "1394 interface bus" or an analog signal line to be utilized over to the other in response to reproduced information in order to prevent output information from being interrupted temporarily or stopped completely whenever the reproduced information changes from analog information to digital information and vice versa.

In order to achieve the above object, the present invention provides, according to an aspect thereof, an information reproducing apparatus which can reproduce information recorded in a recording medium and has an analog interface of transmitting the information in a signal configuration of analog to an external equipment and has a digital interface of transmitting the information in a signal configuration of digital to an external equipment. The information reproducing apparatus comprises analog information outputting means for outputting predetermined analog information through the analog interface in accordance with a request for outputting analog information through the digital interface from the external equipment connected through the digital interface and switching means for switching an interface of outputting reproduced information over to the analog interface or the digital interface in response to information reproduced from the recording medium.

According to another aspect of the present invention, there provided an information recording/reproducing apparatus which has a recording function of recording at least one of analog information and digital information in a recording medium and has a reproducing function of reproducing analog information and digital information recorded in the recording medium. The information recording/reproducing apparatus comprises an analog interface of transmitting the analog information to and receiving the analog information from external equipment and a digital interface of transmitting the digital information to and receiving the digital information from external equipment. The information recording/reproducing apparatus further comprises analog information outputting means for outputting predetermined analog information through the analog interface in accordance with a request for outputting analog information through the digital interface from the external equipment connected through the digital interface, discriminating means for discriminating whether information reproduced from the recording medium is the analog information or the digital information, and switching means for switching an interface of outputting reproduced information over to one of the analog interface and the digital interface in accordance with a result of discrimination by the discriminating means.

According to further aspect of the present invention, there provided an information selectively outputting apparatus, which has an analog interface of being inputted with analog information from an external equipment and has a digital interface of transmitting digital information to and receiving digital information from an external equipment, wherein the analog interface is provided with at least one analog port of transmitting analog information from the external equipment to the analog interface. The information selectively outputting apparatus comprises connecting port confirmation means for transmitting a request for transmission of analog information to a digital port, which is connected to a digital interface provided in the external equipment, and for correlating the digital port with an analog port at which analog information in response to the request for transmission of analog information is detected. The information selectively outputting apparatus is further characterized by that information transmitted through one port out of the analog port and the digital port correlated by the connecting port confirmation means is selectively outputted in accordance with a condition of receiving information, whenever the information is received through the analog port or the digital port.

The above mentioned information selectively outputting apparatus is further characterized by that digital information supplied from the external equipment through the digital port is outputted as a signal of predetermined format and by that analog information supplied to the analog port correlated by the connecting port confirmation means is outputted as a signal of predetermined format when the digital information is not supplied.

According to furthermore aspect of the present invention there provided an electronic apparatus system composed of an information reproducing apparatus, which can reproduce information recorded in a recording medium, and an information selectively outputting apparatus which is connected to the information reproducing apparatus, wherein the information reproducing apparatus comprises an analog interface of transmitting analog information to the information selectively outputting apparatus and a digital interface of transmitting digital information to and receiving digital information from the information selectively outputting apparatus, and wherein the information selectively outputting apparatus comprises an analog interface to which analog information from the information reproducing apparatus is inputted through an analog port and a digital interface of transmitting digital information to and receiving digital information from the information reproducing apparatus.

In addition thereto, the information reproducing apparatus further comprises analog information outputting means for outputting predetermined analog information through the analog interface in accordance with a request for outputting analog information through the digital interface from the information selectively outputting apparatus and switching means for switching an interface of outputting reproduced information over to one of the analog interface and the digital interface in response to information reproduced from the recording medium, and wherein the information selectively outputting apparatus further comprises connecting port confirmation means for transmitting a request for transmission of analog information to a digital port, which is connected to the digital interface provided in the information reproducing apparatus, and for correlating the digital port with an analog port at which analog information in response to the request for transmission of analog information is detected. The information selectively outputting apparatus is further characterized by that information transmitted through one port out of the analog port and the digital port correlated by the connecting port confirmation means is selectively outputted in accordance with a condition of receiving information, whenever the information is received through the analog port or the digital port.

Other object and further features of the present invention will be apparent from the following detailed description when read in conjunction with the accompanying drawings.

BRIEF DESCRIPTION OF DRAWINGS

FIG. 6(a) shows a message format related to a medium according to the embodiment of the present invention.

FIG. 6(b) shows another message format related to a medium according to the embodiment of the present invention.

FIG. 7 shows a content of information related to a medium according to the embodiment of the present invention.

FIG. 8(a) shows a message format of an output signal according to the embodiment of the present invention.

FIG. 8(b) shows another message format of an output signal according to the embodiment of the present invention.

FIG. 9 shows a content of information related to an output signal according to the embodiment of the present invention.

DETAILED DESCRIPTION OF THE PREFERRED EMBODIMENTS

[Embodiment]

Figure 1A:
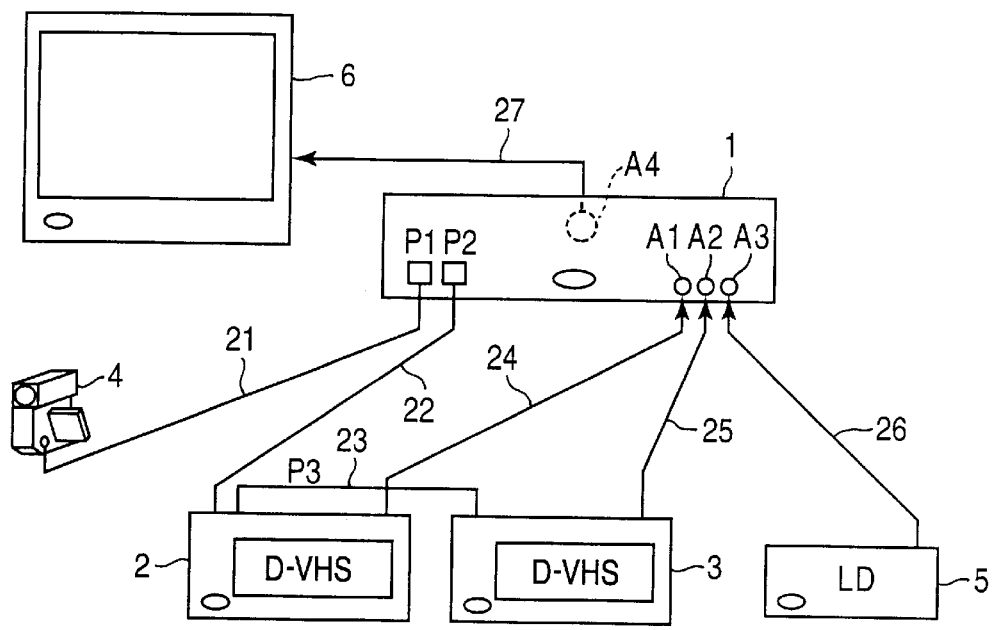
FIG. 1(a) shows a typical configuration of an electronic apparatus system according to an embodiment of the present invention.

FIG. 1(a) is a configuration of an electronic apparatus system according to an embodiment of the present invention. In FIG. 1(a), the electronic apparatus system comprises a digital broadcast receiving apparatus 1, a first VCR 2 and a second VCR 3 in conformity with the D-VHS® system, a digital video camera 4 in conformity with the DV (Digital Video) system or the DVC (Digital Video Cassette) system, an analog video disc (LD) player 5, and a monitor 6 for displaying video image and for outputting audio. The electronic apparatus system is depicted hereinafter with assuming that the digital broadcast receiving apparatus 1 such as a set top box is one example of an information selectively outputting apparatus and that the first VCR 2 and the second VCR 3 in conformity with the D-VHS® system and the digital video camera 4 in conformity with the DV system or the DVC system are examples of information reproducing apparatuses or information recording/reproducing apparatuses.

The digital broadcast receiving apparatus 1 is equipped with digital ports P1 and P2, which enable to connect a "1394 interface bus", input/output terminals or analog ports A1 through A3 for video and audio signals in analog, that is, for analog information, and an output terminal or analog port A4. The digital video camera 4 is connected to the digital port P1 through a "1394 interface bus" 21 and the first VCR 2 is connected to the digital port P2 through a "1394 interface bus" 22. The second VCR 3 is connected to the first VCR 2 through a "1394 interface bus" 23. The first VCR 2 and the second VCR 3 are connected to the analog ports A1 and A2 of the digital broadcast receiving apparatus 1 through analog signal lines 24 and 25 respectively. The LD player 5 is connected to the analog port A3 of the digital broadcast receiving apparatus 1 through an analog signal line 26. The monitor 6 is connected to the analog port A4 of the digital broadcast receiving apparatus 1 through an analog signal line 27. In addition thereto, the digital broadcast receiving apparatus 1 is organized to recognize such that the second VCR 3 is connected to a third digital port P3. The third digital port P3 is an imaginary port and is not actually provided in the digital broadcast receiving apparatus 1.

Figure 2:
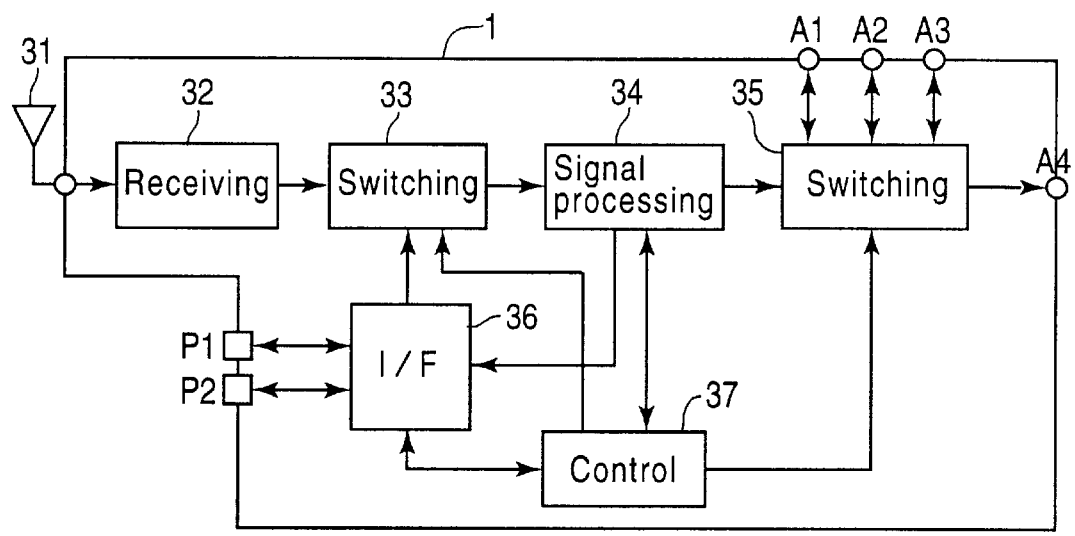
FIG. 2 shows a block diagram of a digital broadcast receiving apparatus shown in FIGS. 1(a) and 1(b).

An external antenna 31 is connected to the digital broadcast receiving apparatus 1 as shown in FIG. 2. In FIG. 2, the digital broadcast receiving apparatus 1 comprises a receiving section 32, a switching circuit 33, a signal processing section 34, another switching circuit 35, a digital interface (I/F) section 36, a control section 37, the digital ports P1 and P2, and the analog ports A1 through A4. The digital broadcast receiving apparatus 1 performs signal processing such as frequency conversion, decoding, and error correction. The receiving section 32 outputs a processed signal as a received digital broadcasting signal. The I/F section 36 transmits digital information to or receives digital information from the digital ports P1 and P2 through a "1394 interface bus". The switching circuit 33 switches the received digital broadcast signal outputted from the receiving section 32 over to a signal inputted from the I/F section 36 and vice versa. The signal processing section 34 performs signal processing such as signal extraction of extracting a signal in accordance with a desired program from a received digital signal or from a signal of a magnetic tape reproduced by the first VCR 2 or the second VCR 3, descrambling, expansion, and digital to analog conversion and further performs signal processing so as to record the extracted digital information, which was performed signal extraction, by the first VCR 2 or the second VCR 3 in conjunction with outputting processed analog video and audio signals or analog information to a switching circuit 35. Then the signal processing section 34 outputs the processed signal to the I/F section 36. The switching circuit 35 outputs a signal from the signal processing section 34 to one of the analog ports Al through A3 in conjunction with outputting one signal, which is selected out of a signal from the signal processing section 34 or another signal from the analog ports A1 through A3, to the analog port A4. The control section 37 controls the switching circuits 33 and 35, the signal processing section 34, and the I/F section 36. In addition thereto, an input/output circuit section toward to the analog ports A1 through A3 of the switching circuit 35 configures an analog interface although it is not shown in FIG. 2.

Figure 3:
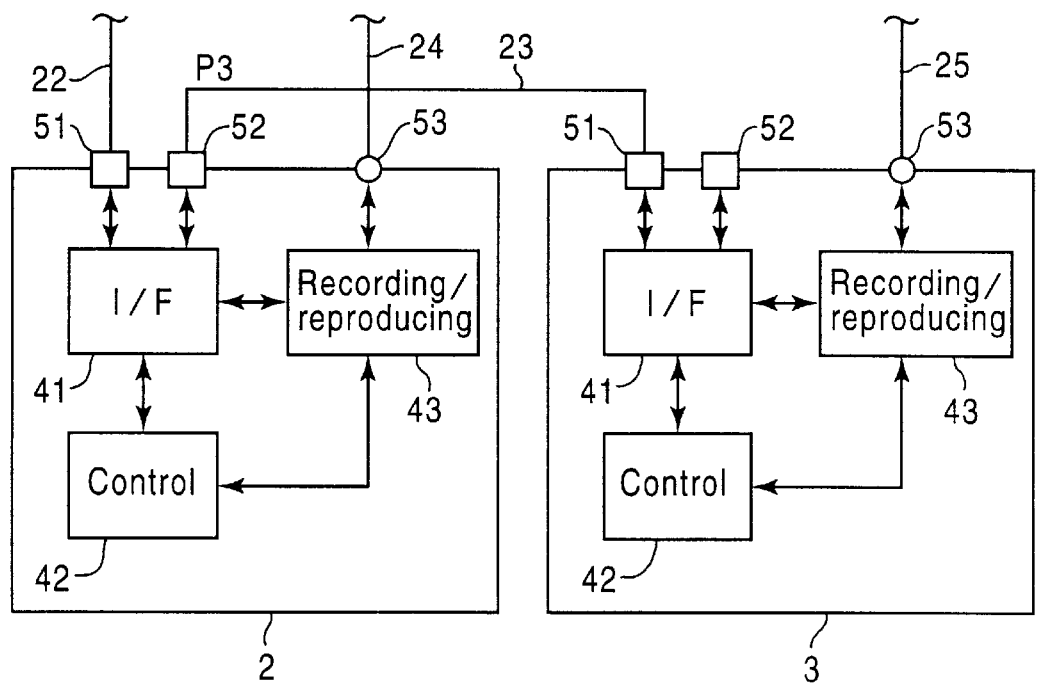
FIG. 3 shows a block diagram of a video cassette recorder (VCR) shown in FIGS. 1(a) and 1(b).

As shown in FIG. 3, the first VCR 2 comprises digital signal terminals 51 and 52, an analog signal terminal 53, a digital interface (I/F) section 41, a recording/reproducing section 43, and a control section 42. The digital signal terminals 51 and 52 are connected with the "1394 interface bus" 22 and 23 respectively. The I/F section 41 transmits and receives data through a "1394 interface bus". The recording/reproducing section 43 records digital information on or reproduces digital information from a magnetic tape as a recording medium, and reproduces analog information from the magnetic tape. The control section 42 controls the I/F section 41 and the recording/reproducing section 43. The second VCR 3 is the same configuration as that of the first VCR 2. In the recording/reproducing section 43, an input/output circuit section toward the digital signal terminals 51 and 52 is provided as a digital interface although it is not shown in FIG. 3. The digital signal terminal 52 of the first VCR 2 is connected to the digital signal terminal 51 of the second VCR 3 through the "1394 interface bus" 23, wherein the digital broadcast receiving apparatus 1 recognizes that the second VCR 3 is connected to the third digital port P3 through the "1394 interface bus" 23. Each analog signal terminal 53 of the first VCR 2 and the second VCR 3 is connected with the analog signal lines 24 and 25 respectively.

Both the first VCR 2 and the second VCR 3 can record and reproduce a MPEG2 TS packet, that is, digital information transmitted from the digital broadcast receiving apparatus 1 through the "1394 interface bus" 22 and 23 and also can record and reproduce analog information such as an analog video signal and an analog audio signal in conformity with the VHS® standard.

Each control section 42 of the first VCR 2 and the second VCR 3 has a function of discriminating means. In case that a sub code signal inherent in digital information is detected in a reproduced signal, it is discriminated that digital information are reproduced. In case that the sub code signal is not detected, it is discriminated that analog information are reproduced. Further, the control section 42 controls to output reproduced information to the digital broadcast receiving apparatus 1 through the I/F section 41 and the "1394 interface bus" 22 and 23 when digital information recorded on a magnetic tape are reproduced, or controls to output reproduced information to the digital broadcast receiving apparatus 1 through the analog signal lines 24 and 25 when analog information are reproduced. In case that both analog information and digital information are recorded on one magnetic tape, when a reproduced information changes over from analog information to digital information, for example, it is processed that a mode of outputting the analog information through the analog signal terminal 53 is changed over to another mode of outputting the digital information through the digital signal terminal 51. On the other hand, when a reproduced information changes over from digital information to analog information, it is processed that a mode of outputting the digital information through the digital signal terminal 51 is changed over to another mode of outputting the analog information through the analog signal terminal 53.

Accordingly, the digital broadcast receiving apparatus 1 performs appropriate control with a checking process of connected apparatuses mentioned below in accordance with the above mentioned mode changing of the first VCR 2 and the second VCR in order to change the digital port P1 or P2 over to the analog port A1 or A2 and vice versa in accordance with the mode changing in the first VCR 2 and the second VCR 3. The checking process of connected apparatuses is performed by the digital broadcast receiving apparatus 1, the digital broadcast receiving apparatus 1 recognizes whether or not an apparatus previously connected through a "1394 interface bus" is also connected through an analog signal line. In case that an apparatus is connected through the analog signal line as well as through the "1394 interface bus", the digital broadcast receiving apparatus 1 also recognizes which apparatus is the apparatus in accordance with the checking process of connected apparatuses.

Figure 4:
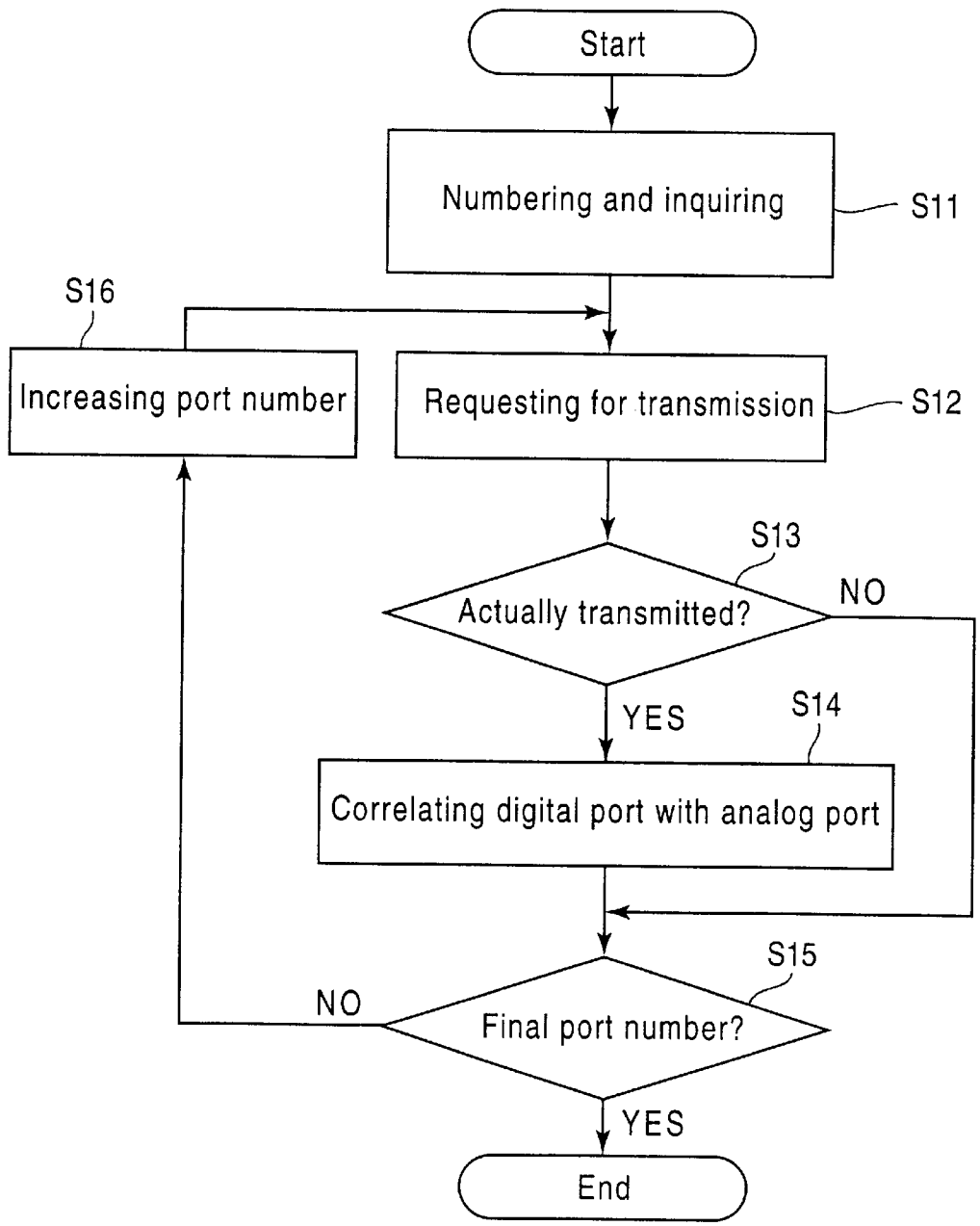
FIG. 4 shows a flow chart of depicting a checking process of apparatus connected to the digital broadcast receiving apparatus shown in FIG. 2.
Figure 5:
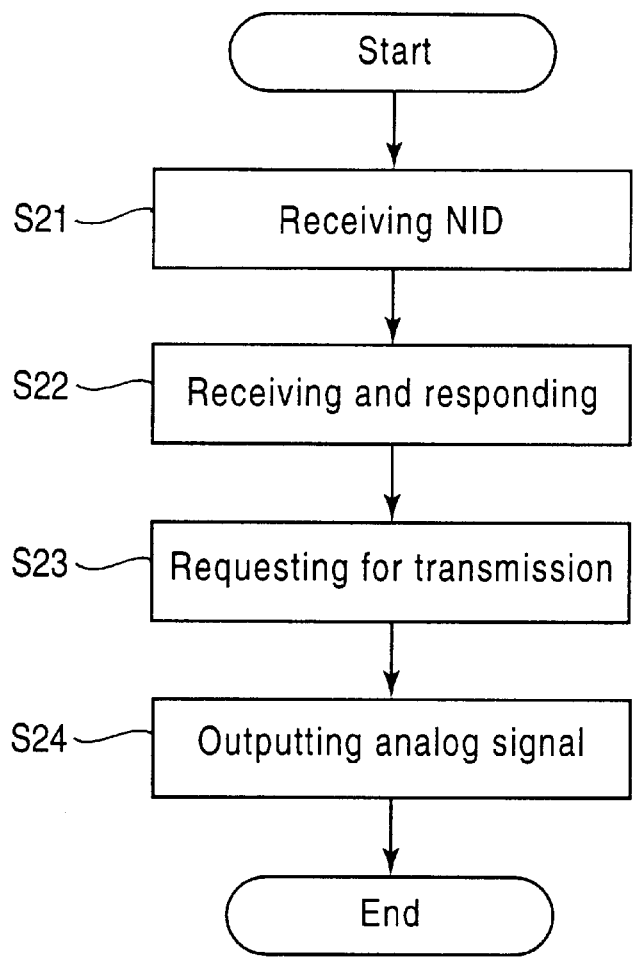
FIG. 5 shows a flow chart of responding process performed in the VCR shown in FIG. 3.
Figure 12:
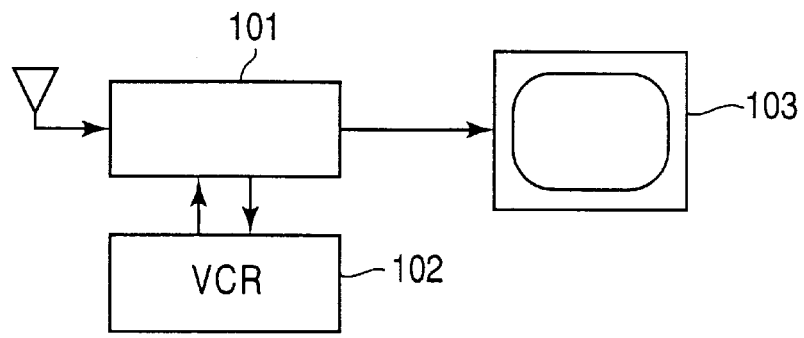
FIG. 12 shows a typical connection diagram among a digital broadcast receiving apparatus, a VCR, and a monitor.

FIG. 4 is a flow chart of a checking process of apparatuses connected to the digital broadcast receiving apparatus 1 and the process is performed by the control section 37 in the digital broadcast receiving apparatus 1. The checking process is performed by directing through a control panel, which is not shown, when a user has completed to connect apparatuses. FIG. 5 is a flow chart of responding process performed in a apparatus, which is connected to the digital broadcast receiving apparatus 1 through a "1394 interface bus", such as the control section 42 in the first VCR 2 and the second VCR 3.

In FIG. 4, an apparatus connected through a port of "1394 interface bus", that is, the digital port P1 or P2, is numbered and is inquired about a type of apparatus, a type of medium, configuration of output signals, and a name of manufacturer (step S11). In addition thereto, the second VCR 3 is recognized by the digital broadcast receiving apparatus 1 that the second VCR 3 is connected to the digital port P3 as mentioned above. According to the embodiment of the present invention, the process performed in the step S11 is applied to all the digital ports P1 through P3. For example, the digital video camera 4, the first VCR 2, and the second VCR 3 are numbered 0 (zero), 1, and 2 respectively as an apparatus number NID (Node IDentification).

On the other hand, as shown in FIG. 5, a connected electronic apparatus such as the digital video camera 4, the first VCR 2, and the second VCR 3 receives an apparatus number NID from the control section 37 of the digital broadcast receiving apparatus 1 (step S21). The control section 42 performs a process of receiving a command of inquiry such as a type of device and a process of responding to the command (step S22). For example, a type of device is replied such as a video camera in conformity with the DVC system or a VCR in conformity with the D-VHS® system. A type of medium is replied such as a DVC mini-cassette or a cassette tape in conformity with the D-VHS® system. Configuration of output signal is replied such as SD 525/60 mode, that is, standard signal of the DVC standard (SD) with 525 scanning lines and 60 fields, or MPEG 12.5 Mbps–60 mode, that is, a MPEG transport stream packet at a data rate of 12.5 Mbps in 60 fields.

Referring back to FIG. 4, at first the digital video camera 4 connected to the digital port P1 is requested to transmit an analog signal (step S12). The request is performed by the asynchronous sub action specified by the IEEE 1394 standard. Then, it is judged whether or not the analog signal is actually transmitted (step S13). However, since the digital video camera 4 is not connected to the digital broadcast receiving apparatus 1 through an analog signal line, the process of responding to the request is not performed. Therefore, an answer of judgement at the step S13 is negative or NO. The process is forward to a step S15 of judging whether or not a port number is a final one. An answer at the step S15 is also negative or NO. The process is forward to a step S16 and a port number is incrementally changed, then the process is returned back to the step S12.

Transmission of an analog signal is requested to the first VCR 2 connected to the digital port P2. As shown in FIG. 5, the first VCR 2 receives the request for transmission of an analog signal (step S23) and outputs the analog signal to the digital broadcast receiving apparatus 1 through the analog signal line 24 (step S24), wherein the analog signal outputted by the first VCR 2 is a predetermined signal such as a signal including only a synchronous signal.

Consequently, in FIG. 4, an answer of the step S13 becomes positive or YES and the digital port P2 is corresponded to the analog port A1, which was inputted with an analog signal (step S14). Then the process is forward to the step S12 through the steps S15 and S16. With respect to the digital port P3, the same process as that for the digital port P1 is performed and the digital port P3 is corresponded to the analog port A2. In other words, the analog ports A1 and A2 are corresponded to the first VCR 2 and the second VCR 3 connected to the digital ports P2 and P3 respectively. A corresponded correlation is stored in a memory of the control section 37. When a process for the digital port P3 is completed, an answer of the step S15 becomes positive or YES. The process comes to end.

As mentioned above, through the processes shown in FIGS. 4 and 5, the digital broadcast receiving apparatus 1 recognizes that both the digital port P2 and the analog port A1 are connected to the first VCR 2 or the apparatus of device number NID=1, and both the digital port P3 and the analog port A2 are connected to the second VCR 3 or the apparatus of device number NID=2.

Accordingly, in case that the digital broadcast receiving apparatus 1 requests each electronic apparatus for outputting an analog signal in a same command and that each electronic apparatus makes the digital broadcast receiving apparatus 1 recognized a correlation between each digital port and each analog port by outputting a same analog signal previously specified, a command outputted by the digital broadcast receiving apparatus 1 and configuration of outputting an analog signal in an electronic apparatus can be simplified. In case that the digital broadcast receiving apparatus 1 requests each electronic apparatus for outputting an analog signal in a same command but individual parameters for each electronic apparatus and that each electronic apparatus organizes so as to output an analog signal in response to the parameter, it is possible for the digital broadcast receiving apparatus 1 to recognize a correlation between each digital port and each analog port in a moment.

The control section 37 in the digital broadcast receiving apparatus 1 monitors signals supplied from each port. In case that input digital information from the digital port P2 are interrupted while input digital information from the digital port P2 are processed and corresponding analog information to the digital information are outputted from the analog port A4, the control section 37 controls the switching circuit 35 so as to immediately output analog information from the analog port A1. On the other hand, in case that input analog information from the analog port A1 are interrupted while analog information from the analog port A1 are outputted from the analog port A4, the control section 37 controls the switching circuit 33 so as to select digital information from the I/F section 36 and further controls the switching circuit 35 so as to immediately output analog information from the signal processing section 34. Furthermore, the control section 37 performs the same process as mentioned above for the digital port P3 and the analog port A2, which are correlated each other.

Accordingly, in case that the first VCR 2 or the second VCR 3 reproduces a magnetic tape and reproduced a video signal is displayed on the monitor 6 through the digital broadcast receiving apparatus 1, the digital broadcast receiving apparatus 1 immediately performs the above mentioned process if reproduced information change from digital information to analog information and vice versa while reproduction, then output information to the monitor 6 are smoothly changed in response to the reproduced information.

An inquiry about a type of medium at the step S11 in FIG. 4 is actually performed by sending a status command of medium information as shown in FIG. 6(a) to the first VCR 2 or the second VCR 3. The status command comprises 8 bits of operation code (opcode) indicating a type of command and two operands [0] and [1]. In FIG. 6(a), "msb" and "lsb" mean "most significant bit" and "least significant bit" respectively. A suffix "h" of "DAh" is attached so as to indicate that a "DA" is in hexadecimal. The operation code "DAh" represents that its command or response is related to medium information. The operands [0] and [1] of the status command of medium information are assigned at 7Fh and they are a command, which inquire medium information into the first VCR 2 or the second VCR 3.

The status command of medium information is received at the step S22 in FIG. 5 and its content is interpreted, then necessary process for response is performed. In other words, when a status command of medium information shown in FIG. 6(a) is received, a medium information response, which is composed of an information indicating a type of cassette or operand [0] and another information indicating tape grade and indicating whether or not recording is prohibited, that is, operand [1] as shown in FIG. 6(b), is transmitted.

FIG. 7 depicts a relation between codes and their contents included in a medium information response. In FIG. 7, in case that an operand [0] indicating a type of cassette is "22h", it represents a VHS® cassette. In case that an operand [1] indicating tape grade and recording inhibition is "40h", it represents that a tape is an S-VHS® tape and the tape enables to be recorded. Further, in case that the operands [0] and [1] are "22h" and "51h" respectively, a tape loaded is a VHS® cassette including a D-VHS® tape and it is designated as recording inhibited, that is, the tape can not be recorded. Furthermore, in case that no cassette is loaded or an unknown cassette is loaded, a command "7Fh" is sent back to the digital broadcast receiving apparatus 1. In addition thereto, a command of a type of cassette is "32h" if the digital video camera 4 receives a status command of medium information.

When the digital broadcast receiving apparatus 1 inquires about configuration of output signal at the step S11 in FIG. 4, it transmits a status command of output signal as shown in FIG. 8(a). An operand [0] of the status command of output signal is designated to "FFh" and represents a command which inquires about configuration of an output signal into the first VCR 2 or the second VCR 3.

The first VCR 2 or the second VCR 3 receives the status command of output signal at the step S22 in FIG. 5 and interprets a content of the status command, and then it performs necessary process for response. In other words, in case that the VCR receives a status command of output signal as shown in FIG. 8(a), the VCR transmits an output signal response including information of signal mode, that is, an operand [0] as shown in FIG. 8(b). A mode of an output signal related to a value of the operand [0] is depicted in FIG. 9. For example, in case that the operand [0] is "00h", a signal mode represents an SD signal, which is a digital signal of standard resolution in conformity with the DVC standard, in a standard mode or standard recording speed of the 525/60 mode system. In case that the operand [0] is "04h", a signal mode represents an SD signal of long play time mode of the 525/60 mode system. In case that the operand [0] is "10h", a signal mode represents an MPEG transport stream packet of a data rate of 25 Mbps and a field frequency of 60 Hz. In case that the operand [0] is "05h", a signal mode represents an analog signal of an NTSC signal of the 525/60 mode system in conformity with the VHS® standard.

Figure 1B:
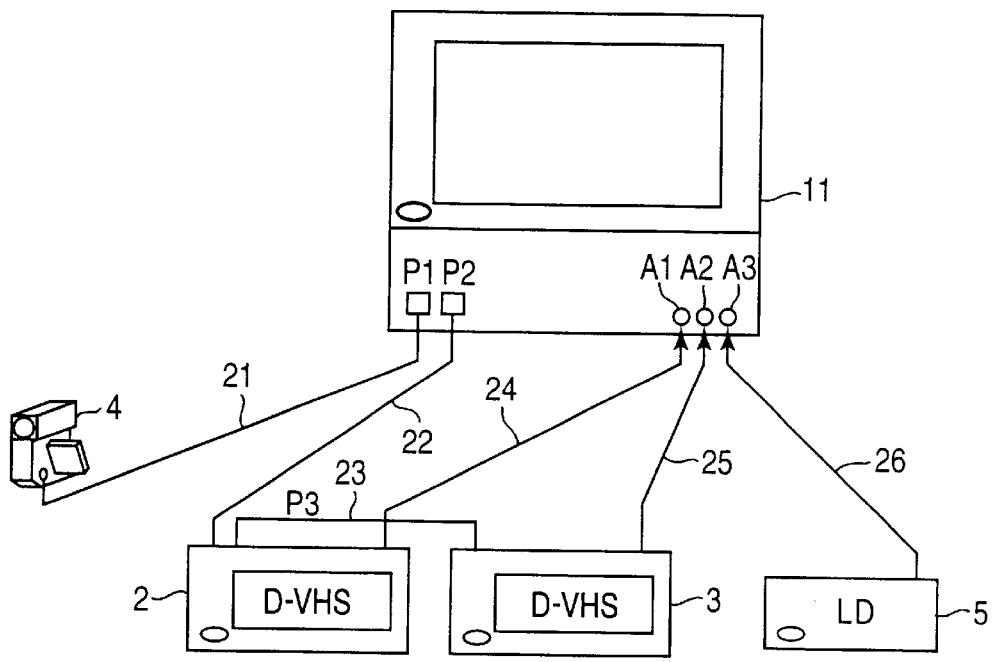
FIG. 1(b) shows one variation of configuration of an electronic apparatus system according to the embodiment of the present invention.
Figure 10:
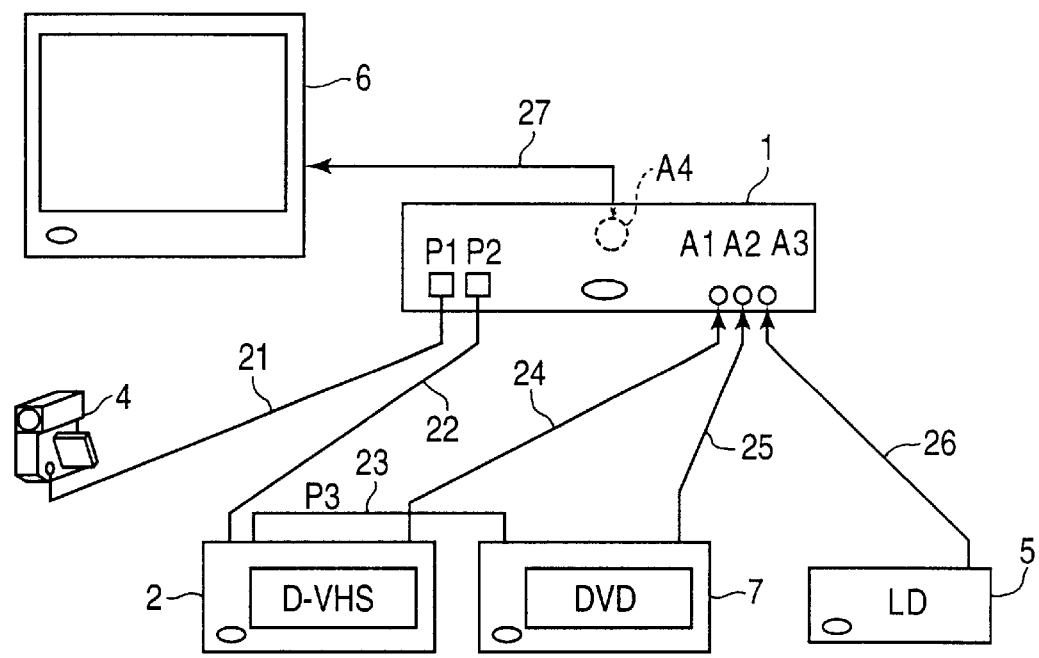
FIG. 10 shows another variation of a configuration of an electronic apparatus system according to the embodiment of the present invention.
Figure 11:
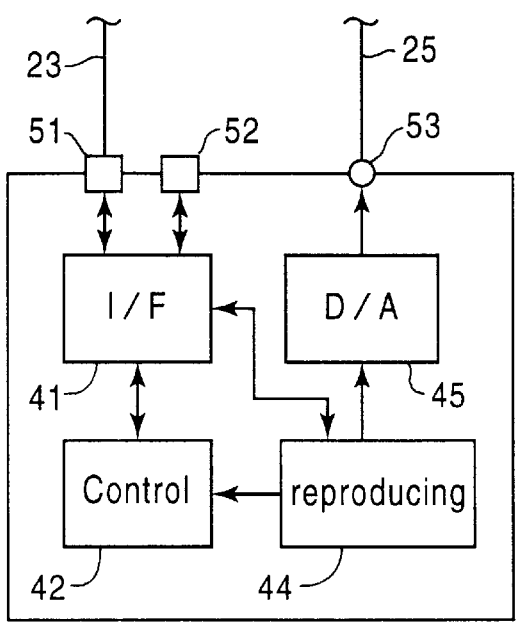
FIG. 11 shows a block diagram of a DVD (Digital Video Disc or Digital Versatile Disc) equipment shown in FIG. 10.

While the invention has been described above with reference to the embodiment thereof, it is apparent that many changes, modifications and variations in the arrangement of equipment and devices can be made without departing from the invention concept disclosed herein. For example, the digital broadcast receiving apparatus 1 and the monitor 6 shown in FIG. 1(a) can be arranged as a monitor 11 including a digital broadcast receiving device as shown in FIG. 1(b). In addition thereto, an information reproducing apparatus or an information recording/reproducing apparatus is not limited to a VCR. An apparatus, which can reproduce or record a magnetic disc or an optical disc as a recording medium, is also acceptable for the invention concept disclosed herein. FIG. 10 is an exemplary diagram of a variation of FIG. 1(a), wherein the second VCR 3 in FIG. 1(a) is replace by a DVD equipment 7. FIG. 11 is a block diagram of the DVD equipment 7 shown in FIG. 10.

As shown in FIG. 11, the DVD equipment 7 comprises the digital interface (I/F) section 41, the control section 42, a reproducing section 44, a digital to analog (D/A) conversion circuit 45, the digital signal terminals 51 and 52, and the analog signal terminal 53. A "1394 interface bus" 23 and an analog signal line 25 are connected to the digital signal terminal 51 and the analog signal terminal 53 respectively. A total configuration of the DVD equipment 7 is similar to that of the second VCR 3 shown in FIG. 3 except the D/A conversion circuit 45 and the reproducing section 44. The recording/reproducing section 43 of the second VCR 3 is replaced with the reproducing section 44 of the DVD equipment 7.

While the digital broadcast receiving apparatus 1 recognizes that the digital port P3 and the analog port A2 are connected to the DVD equipment 7, in case that digital information reproduced by the reproducing section 44 changes from an information protected by a copy right, for instance, to another information not protected by a copy right and vice versa, the digital broadcast receiving apparatus 1 immediately changes an input port. In other words, the digital broadcast receiving apparatus 1 switches the input port over to the analog port A2 for the information protected by the copy right or to the digital port P3 for the information not protected by the copy right.

According to the aspect of the present invention, the information reproducing apparatus or the information recording/reproducing apparatus can surely transmit reproduced information to an external equipment while reproducing a recording medium recorded with both analog information and digital information although the reproduced information changes from analog information to digital information and vice versa, since an interface outputting the reproduced information is immediately switched over to an analog interface or a digital interface in accordance with information reproduced from the recording medium. Further, when a state of permitting to output reproduced information through a digital interface is changed over to another state of prohibiting to output reproduced information and vice versa, an interface to be utilized is immediately switched over to an appropriate interface and the reproduced information is securely transmitted to the external equipment. Accordingly, the reproduced information is prevented from interrupting process temporarily or stopping process completely as long as the external equipment performs appropriate switching control.

According to another aspect of the present invention, the information selectively outputting apparatus can immediately change an interface to be utilized over to an appropriate interface and securely receive reproduced information and prevent the reproduced information from interrupting process temporarily or from stopping process completely although an output from an external equipment changes from a digital interface to an analog interface, since a correlation between an analog port and a digital port related to connection with the external equipment is assigned by confirmation means of connecting port.

According to further aspect of the present invention, the electronic apparatus system can immediately change an interface to be utilized over to an appropriate interface and securely receive reproduced information and prevent the reproduced information from interrupting process temporarily or from stopping process completely, since the information selectively outputting apparatus changes an interface for inputting in accordance with that the information reproducing apparatus changes an interface for outputting reproduced information over to an appropriate one.

What is claimed is:

1. An information reproducing apparatus, which can reproduce information recorded in a recording medium, having an analog interface for transmitting said information in a signal configuration of analog to an external equipment and having a digital interface for transmitting said information in a signal configuration of digital to said external equipment, said information reproduction apparatus comprising:

analog information outputting means for outputting predetermined analog information through said analog interface in accordance with a request from said external equipment connected through said digital interface; and switching means for switching an interface of outputting reproduced information over to one of said analog interface and said digital interface in response to information reproduced from said recording medium.

2. An information recording/reproducing apparatus having a recording function of recording at least one of analog information and digital information in a recording medium and having a reproducing function of reproducing analog information and digital information recorded in the recording medium, said information recording/reproducing apparatus comprising:

an analog interface for transmitting said analog information to an external equipment; and a digital interface for transmitting said digital information to and receiving said digital information from said external equipment, said information recording/reproducing apparatus further comprising:

analog information outputting means for outputting predetermined analog information through said analog interface in accordance with a request from said external equipment connected through said digital interface;

discriminating means for discriminating whether information reproduced from said recording medium is said analog information or said digital information; and switching means for switching an interface of outputting reproduced information over to one of said analog interface and said digital interface in accordance with a result of discrimination by said discriminating means.

3. An information selectively outputting apparatus having an analog interface of being inputted with analog information from an external equipment and having a digital interface of transmitting digital information to and receiving digital information from said external equipment, wherein said analog interface is provided with at least one analog port for receiving analog information from said external equipment, said information selectively outputting apparatus comprising:

connecting port confirmation means for transmitting a request signal to a digital port of said external equipment wherein said external equipment transmits predetermined analog information to said analog port in response to receiving said request signal, and for correlating said digital port with an analog port at which said predetermined analog information is detected, said information selectively outputting apparatus further characterized by that information transmitted from said external equipment is selected between said analog information through said analog port correlated by said connecting port confirmation means and said digital information through said digital port in accordance with a condition of receiving information.

4. An information selectively outputting apparatus in accordance with claim 3, wherein said information selectively outputting apparatus is further characterized in that digital information supplied from said external equipment through said digital port is outputted as a signal of predetermined format, and analog information supplied from said external equipment through said analog port correlated by said connecting port confirmation means is outputted as said signal of predetermined format when said digital information is not supplied.

5. An electronic apparatus system comprising:

an information reproducing apparatus, which can reproduce information recorded in a recording medium; and an information selectively outputting apparatus connected to said information reproducing apparatus, said information reproducing apparatus further comprising:

a first analog interface of transmitting said information to said information selectively outputting apparatus as an analog reproduced information;

a first digital interface of transmitting said information to said information selectively outputting apparatus as a digital reproduced information;

analog information outputting means for outputting predetermined analog information through said first analog interface in accordance with a request signal from said information selectively outputting apparatus; and switching means for switching an interface of outputting said reproduced information over to one of said analog interface and said digital interface in response to information reproduced from said recording medium, said information selectively outputting apparatus further comprising:

a second analog interface of being inputted with said analog reproduced information from said information reproducing apparatus;

a second digital interface of transmitting digital information to and receiving said digital reproduced information from said information reproducing apparatus;

connecting port confirmation means for transmitting said request signal to a digital port of said information reproducing apparatus and for correlating said digital port with an analog port at which said predetermined analog information is detected; and information output means for selecting an output information between said analog reproduced information through said analog port correlated by said connecting port confirmation means and said digital reproduced information through said digital port in accordance with a condition of receiving information, and for outputting said output information.

* * * * *